United States Patent
Dong

(10) Patent No.: US 10,239,042 B2
(45) Date of Patent: Mar. 26, 2019

(54) METHOD FOR PRODUCING A FUNCTIONAL CERAMIC MATERIAL

(71) Applicant: Shenzhen New-Ceramics Environmental Material LLC, Shenzhen (CN)

(72) Inventor: Liangjie Dong, Honolulu, HI (US)

(73) Assignee: Shenzhen New-Ceramics Environmental Material LLC, Shenzhen (CN)

( * ) Notice: Subject to any disclaimer, the term of this patent is extended or adjusted under 35 U.S.C. 154(b) by 265 days.

(21) Appl. No.: 15/393,261

(22) Filed: Dec. 29, 2016

(65) Prior Publication Data

US 2017/0189889 A1 Jul. 6, 2017

(30) Foreign Application Priority Data

Dec. 30, 2015 (CN) .......................... 2015 1 1026200

(51) Int. Cl.
*C02F 1/28* (2006.01)
*B01J 20/02* (2006.01)
(Continued)

(52) U.S. Cl.
CPC ........... *B01J 20/08* (2013.01); *B01J 20/0229* (2013.01); *B01J 20/12* (2013.01); *B01J 20/20* (2013.01); *B01J 20/2808* (2013.01); *B01J 20/28083* (2013.01); *B01J 20/28085* (2013.01); *B01J 20/28092* (2013.01); *B01J 20/3064* (2013.01); *B01J 20/3078* (2013.01); *C02F 1/281* (2013.01); *C04B 35/10* (2013.01); *C04B 35/632* (2013.01); *C04B 35/638* (2013.01); *C04B 35/64* (2013.01); *B01J 2220/4887* (2013.01); *C02F 2101/20* (2013.01); *C02F 2101/32* (2013.01);
(Continued)

(58) Field of Classification Search
CPC .. B01J 20/08; B01J 20/28092; B01J 20/3064; B01J 20/3078; B01J 20/28085; B01J 20/28083; B01J 20/2808; B01J 20/0229; B01J 20/12; B01J 20/16; B01J 20/165; B01J 20/3042; B01J 20/20; B01J 2220/4887; C02F 1/281; C02F 2101/20; C02F 2101/327; C02F 2101/32; C02F 2101/322; C04B 35/10; C04B 35/632; C04B 35/64; C04B 35/638; C04B 2235/6562; C04B 2235/6584; C04B 2235/656; C04B 2235/48; C04B 2235/405; C04B 2235/3218; C01B 32/324; Y02E 50/343
See application file for complete search history.

(56) References Cited

U.S. PATENT DOCUMENTS 4,677,086 A * 6/1987 McCue ................... B01J 20/20
123/519
5,242,879 A * 9/1993 Abe ........................ B01J 20/20
210/756
2013/0330530 A1* 12/2013 Okuya ..................... C04B 33/04
428/218

FOREIGN PATENT DOCUMENTS

CN 101475362 A * 7/2009

* cited by examiner

*Primary Examiner* — Matthew O Savage
(74) *Attorney, Agent, or Firm* — Yong Chen

(57) ABSTRACT

A functional ceramic material made from a raw material mixture which includes 0.1-0.5 wt % iron powder, 20-25 wt % bentonite, and a remainder of sludge (based on dry weight) which contains bacteria. To make the functional ceramic material, the raw material mixture is calcined at low temperature and anaerobic conditions. Use of the material for purifying a medium is also provided.

17 Claims, 2 Drawing Sheets

(51) Int. Cl.
*B01J 20/12* (2006.01)
*B01J 20/20* (2006.01)
*B01J 20/08* (2006.01)
*B01J 20/28* (2006.01)
*B01J 20/30* (2006.01)
*C04B 35/10* (2006.01)
*C04B 35/632* (2006.01)
*C04B 35/638* (2006.01)
*C04B 35/64* (2006.01)
C02F 101/32 (2006.01)
C02F 101/20 (2006.01)

(52) U.S. Cl.
CPC .. *C02F 2101/322* (2013.01); *C02F 2101/327* (2013.01); *C04B 2235/3218* (2013.01); *C04B 2235/405* (2013.01); *C04B 2235/48* (2013.01); *C04B 2235/656* (2013.01); *C04B 2235/6562* (2013.01); *C04B 2235/6567* (2013.01); *C04B 2235/6584* (2013.01); *Y02E 50/343* (2013.01)

METHOD FOR PRODUCING A FUNCTIONAL CERAMIC MATERIAL

CROSS REFERENCE TO RELATED APPLICATION

This application claims priority to Chinese patent application No. 201511026200.5 filed Dec. 30, 2015, the disclosure of which is incorporated herein by reference in its entirety.

BACKGROUND

Municipal wastewater treatment plants use activated sludge process to treat waste water, producing large amounts of sludge. China's annual discharge of dewatered sludge is close to 22 million tons. The activated sludge at room temperature is difficult to dry out, and therefore cannot be used directly. Bacterial cell walls are usually resistant to damage unless heated to a temperature higher than 298° C. But the drying process is very energy consuming.

At present, common methods for treating activated sludge include using activated sludge as composts to produce fertilizer, drying activated sludge to be used for landfills, press drying and incineration, and using activated sludge to produce ceramic filter tiles. However, there are issues in these treatments, e.g., heavy metal precipitation and pathogens and virus contamination in the fertilizer used for composting, pollution of groundwater by the landfills, and production of waste gas and dioxins and high energy consumption in filter press drying. To produce ceramic filter titles, there is a need to include additional amount of clay, and the production is costly and inefficient in energy consumption.

This invention relates to a biochemical ceramic, whose production method and application has been disclosed in Chinese Patent Application No. 200810238351.0, filed on Dec. 15, 2008. The biochemical ceramics is calcined under anoxic condition using waste water sludge-based material, with calcium carbonate or gypsum, clay, calcium hydroxide dihydrate, liquid wax, iron powder or iron oxide powder and other materials. The biochemical ceramics need to be calcined at a temperature of 1000° C. or greater so the bacteria in the sludge can be completely burned and no template or mesopores will be formed. Thus the biochemical ceramic has no mesopores but only micropores. The biochemical ceramics can be used in water treatment to remove TCOD, ammonia, ammonia nitrogen and hydrogen sulfide in water bodies, and can also be used as biological media for bacterial screening. However, the biochemical ceramics requires a high calcination temperature which leads to large energy consumption and high cost.

SUMMARY OF THE INVENTION

In one aspect, the present invention provides a functional ceramic material. The functional ceramic material is prepared by a method comprising calcining a mixture of raw materials at 800° C. to 900° C. under an anaerobic condition, the mixture including: between 0.1 wt % and 0.5 wt % of iron powder, between 20 wt % and 25 wt % of bentonite, and the remainder being sludge, wherein the sum of the wt % of ion powder, bentonite, and sludge when dry equal to 100%. Unless otherwise noted, all percentages in this disclosure refers to weight percentages. The functional ceramic material can include mesopores with a pore size of between 1 and 50 nanometers and micropores with a pore size greater than 50 micrometers. The iron powder in the mixture of raw materials can comprise zero-valent iron having particle diameter of between 20 nanometers and 80 nanometers.

In another aspect, the present invention provides a method for preparing a functional ceramic material. The method comprises calcining a mixture of raw materials at a calcination temperature between 800° C. and 900° C. under an anaerobic condition, the mixture including: between 0.1 wt % and 0.5 wt % of iron powder, between 20 wt % and 25 wt % of bentonite, and the remainder being sludge, wherein the sum of the weight percentage of the ion powder, bentonite, and the sludge, where percentage of the sludge is based on its dry weight, equals to 100%.

As used herein, the word "sludge" refers to a viscous mixture of liquid and solid components. A sludge may include 90% or more water content, and can be dried to have varying lower water content, e.g., 80%, 70%, 60%, 50%, 40%, etc. Ultimately, a sludge may be completely dried. The weight when the sludge is completely dried is referred to as its dry weight. As used herein, the percentage weights of different components for preparing the functional ceramic material of the present disclosure are all based on the dry weight of the components. Before mixing with other components for preparing the ceramic material, a sludge may be pre-dried to a state where the sludge has a certain content (or content range) of water, e.g., about 50%, or about 40-60%, so that it has a suitable viscosity for further processing. A sludge can include about 70-80% or even greater percentage of microorganisms, e.g., bacteria, and the remainder can include inorganic materials, organic fibers, polymers, etc. For example, the sludge can be active sludge produced by treating a waste water with an activated sludge process.

While not wishing to be bound by any particular theory, it is believed that in the preparation method of the present invention, bentonite can pierce the walls of the bacteria in the sludge and absorb water from the bacteria, producing bacterial shells retaining their original shapes and carbonized to form a web structure during calcination. During the calcination, the iron powder form ferrous oxide and ferro ferric oxide, which can fix heavy metals contained in the sludge and prevent them from leaching when the functional ceramic material is stored or used.

In some embodiments of the preparation method, the method includes: before calcining the mixture, stirring and mixing the mixture at a temperature between about 0° C. and about 40° C. at a stirring speed of 40-80 r/min; and heating the mixture up to the calcination temperature.

In some embodiments of the preparation method, the stirring and mixing is performed for a duration of time between 1 hour to 4 hours.

In some embodiments of the preparation method, the calcining is carried out at a temperature between 830° C. and 870° C.

In some embodiments of the preparation method, wherein the heating is carried out at a rate of 4° C./min to 6° C./min.

In some embodiments of the preparation method, the calcining is carried out for a duration of time between 4 hours to 6 hours.

Further, the present invention provides methods of using the functional ceramic material prepared according to the aforementioned preparation methods. In one such method, the functional ceramic material is contacted with a medium, thereby purifying the medium. The medium can be air or a liquid. The liquid can be water (which contains impurities or contaminants), an oil (e.g., a crude oil or petroleum), or a mixture of water and an oil. The impurities or contaminants removed from water by the functional ceramic material can be various heavy metal compounds, radioactive isotopes such as I-131, etc. The substances which can be removed from oil include single-ringed and polycyclic aromatic hydrocarbons (collectively, "aromatics" for short), etc.

The functional ceramic material of the present invention can also be used to reduce Chemical Oxygen Demand (COD) and/or ammonia nitrogen of a water body. The functional ceramic material can be first used as a substrate to grow certain bacteria, such as nitrobacteria, to produce a filter material, and pass the water body through the filter material such that the bacteria retained in the filter can convert the ammonia nitrogen into harmless NO3.

DETAILED DESCRIPTION OF CERTAIN EMBODIMENTS

Hereinafter, the present invention will be described in further details with reference to specific examples below. The inventive product and its related production procedure is not limited to the following examples. Unless otherwise noted, the percentage used below refer to weight percentage.

EXAMPLE 1

A method for preparing a functional ceramic material comprises the following steps:

1. Mixing and stirring a mixture which includes 0.3% of zero-valent iron (Fe(0)) powder (with diameter of 50 nm), 22% bentonite, and 77.7% of sludge (dry weight) at the rate of 40 r/min for 3 hours at room temperature.

2. Under an anaerobic condition, gradually raising the temperature to 850° C. at a ramping rate of 5° C./min, and continuing the calcination process for 6 hours to obtain the functional ceramic material.

Figure 1:
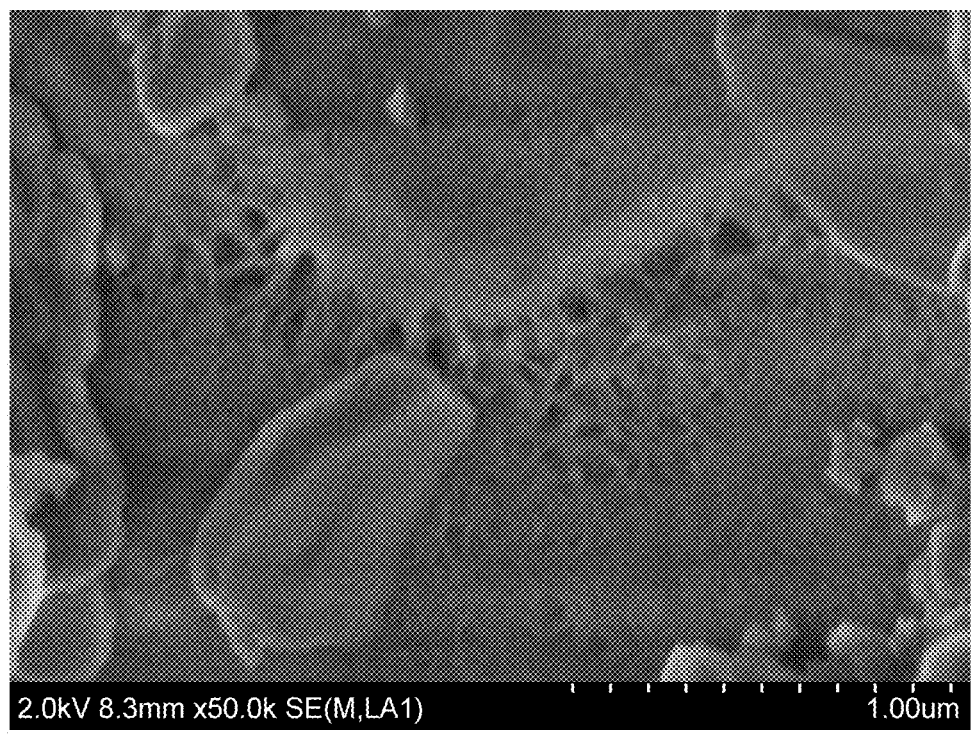
FIG. 1 is a scanning electron micrograph of a functional ceramic material at a 1-micron scale prepared in Example 1.
Figure 2:
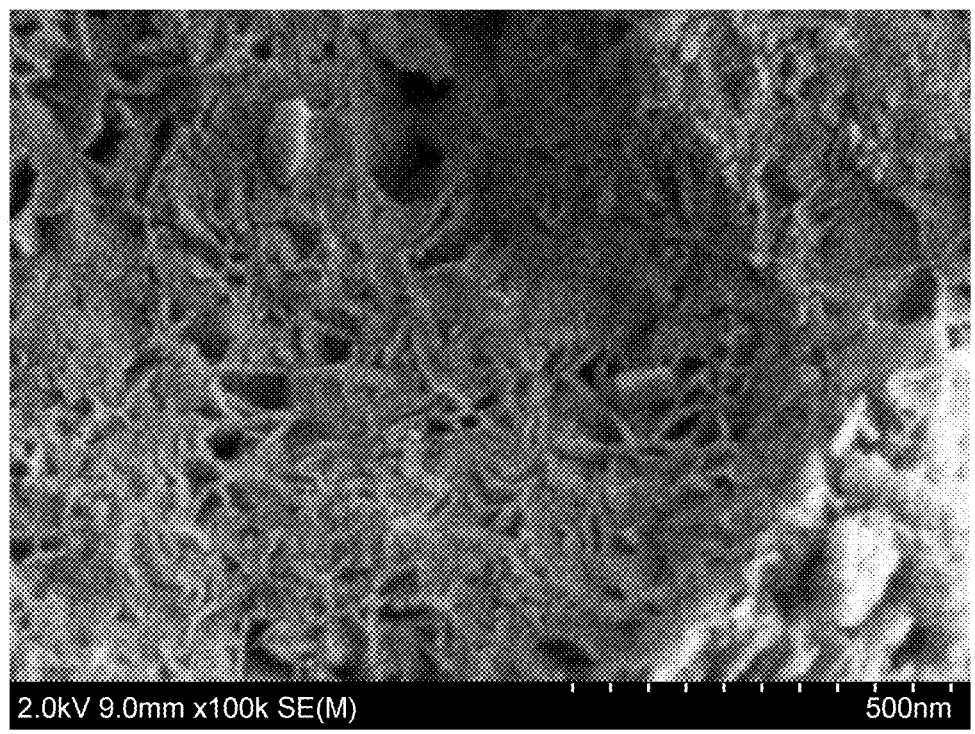
FIG. 2 is a scanning electron micrograph of a functional ceramic material at a 500 nm scale prepared in Example 1.
Figure 3:
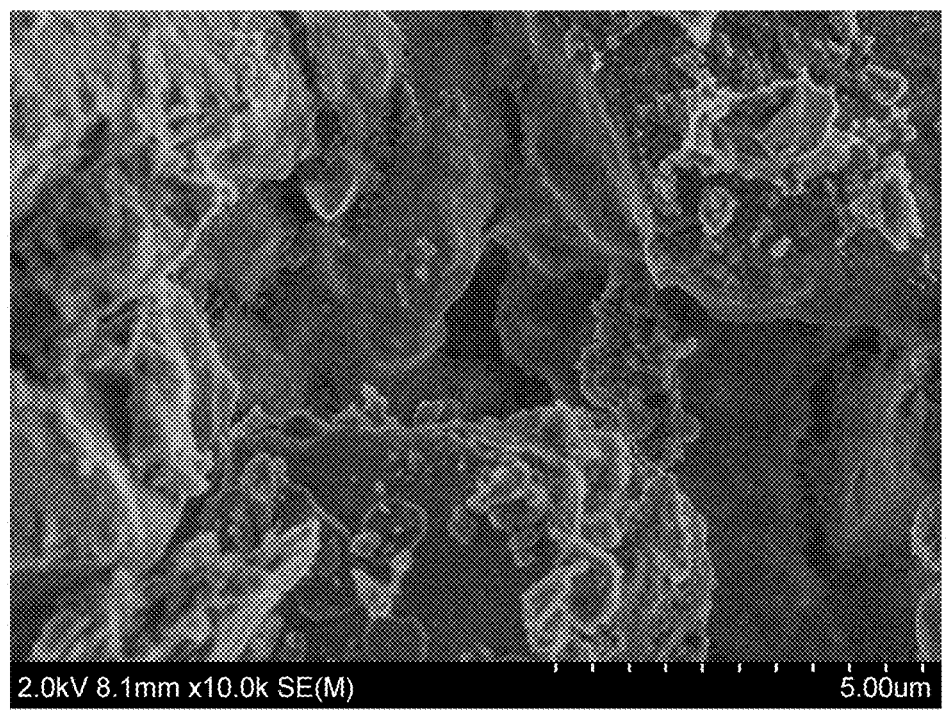
FIG. 3 is a scanning electron micrograph of a functional ceramic material at a 5-micron scale prepared in Example 1.

As can be seen in FIGS. 1 to 3, the functional ceramic material has mesopores with a pore size (diameter) of 1 to 50 nanometers and micropores with diameters larger than 50 micrometers.

EXAMPLE 2

A method for preparing a functional ceramic material comprises the following steps:

1. Mixing and stirring a mixture of 0.1% of zero-valent iron (with diameter of 20 nm), 25% bentonite and 74.9% of sludge (dry weight) at the rate of 80 r/min for 3 hours at room temperature.

2. Under an anaerobic condition, gradually raising the temperature to 870° C. at the ramping rate of 5° C./min, and continuing the calcination process for 4 hours to obtain the functional ceramic material.

EXAMPLE 3

A method for preparing a functional ceramic material comprises the following steps:

1. Mixing and stirring 0.5% of nanometer zero-valent iron (with diameter of 80 nm), 20% bentonite, and 79.5% of sludge (dry weight) at the rate of 50 r/min for 3 hours at room temperature.

2. Under the anaerobic condition, gradually raising the temperature to 830° C. at a ramping rate of 5° C./min. Continue the calcination process for 4 hours to obtain the functional ceramic material.

Adsorption Performance Test of the Functional Ceramic Materials on $^{131}$I

1. Reagents and Equipment

Test materials: Catalytic microfilter material, labeled MN-10-20-1, purchased from Henan Tianyuan Environmental Protection Co., Ltd., used as a control or comparison; functional ceramic materials, prepared in Examples 1-3 herein;

Radioactive Na$^{131}$I solution: approximate radioactivity $3.79 \times 10^4$ Bq;

Water: tap water collected from the China Atomic Energy Research Institute work area;

Deionized water: produced by ELIX 3 pure water system (United States Millipore Inc.);

Electronic balance: model PB3002-E, d=0.01 g, Mettler Toledo Instrument Co., Ltd.;

Separation columns: glass, inner diameter 10 mm, bed height 160 mm;

Low level high purity germanium (HPGe) gamma ray spectrometry: HPGe detector and DSPec spectrometer, manufactured by ORTEC (US).

2. Experimental Procedure 2.1 Test Material Pretreatment 10.00 grams of the test material were weighed, soaked overnight in deionized water, and reserved for later use.

2.2 Determination of the adsorption rate of $^{131}$I 2.2.1 The radioactive Na$^{131}$I solution is divided into five equal parts. One part was diluted with 100 ml tap water, marked as sample DIYYPH2, for direct γ spectrometer measurement; the other four parts were each diluted with 50 ml tap water until the pH is about 2.

2.2.2 Wet packed cartridge material MN-10-20-1. A small amount of polytetrafluoroethylene filaments was filled to both ends of the separation column. A 50 ml portion of the prepared $^{131}$I solution was flowed through the separation column with a flow rate of 1 ml·min$^{-1}$; the separation column was then washed with 50 ml tap water. The effluent was combined for γ spectrometer measurement. This sample is labeled as DI10201PH2.

2.2.3 The pretreated functional ceramic materials prepared in Examples 1-3, were each added into other three parts of Na$^{131}$I solution, respectively. Each solution was stirred for 20 min, then filtered. 25 ml tap water was then added into each of the solution mixture twice, the solutions were each stirred for an additional 20 min, then filtered. The filtrate from each solution was collected (marked as sample DISWTPH2-1, DISWTPH2-2, DISWTPH2-3, respectively) for γ spectrometer measurements.

3. Results

The results of $^{131}$I adsorption experiments are shown in Table 1 below.

TABLE 1

| Material | Sample No. | Radionuclide | Characteristic Peak Energy (keV) | Radioactivity before dilution (Bq) | Statistical error | Adsorption Rate |
|---|---|---|---|---|---|---|
| $^{131}$I solution | DIYYPH2 | I-131 | 364.49 | 1.26E+04 | 0.18% | |
| MN-10-20-1 | DI10201PH2 | I-131 | 364.49 | 2.29E+03 | 0.55% | 81.88% |
| The functional ceramic material made in Example 1 | DISWTPH2-1 | I-131 | 364.49 | 3.48E+00 | 3.02% | 99.97% |
| The functional ceramic material made in Example 2 | DISWTPH2-2 | I-131 | 364.49 | 3.48E+00 | 4.02% | 99.97% |
| The functional ceramic material made in Example 3 | DISWTPH2-3 | I-131 | 364.49 | 3.48E+00 | 4.5% | 99.99% |

Removal of As, Cd, Hg, Tl, Pb, U by the Functional Ceramic Material Prepared in Example 1

Figure 4:
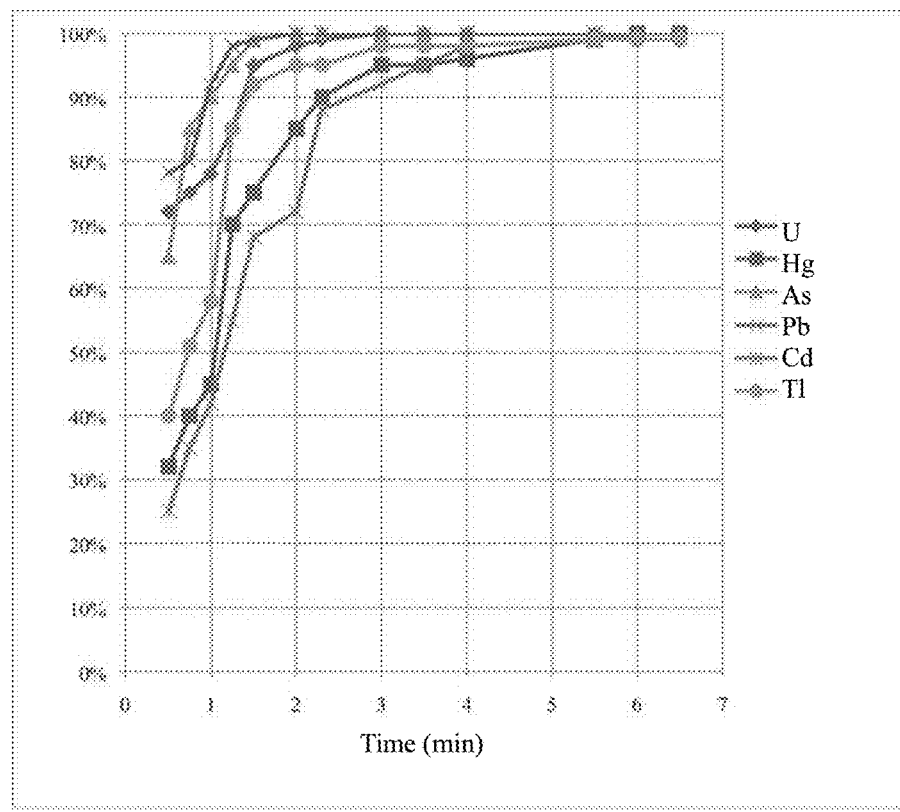
FIG. 4 is a graph showing the removal rate of As, Cd, Hg, Tl, Pb, U from a sample by using the functional ceramic material prepared in Example 1.

The removal rate of As, Cd, Hg, Tl, Pb, U was determined according to MOH "Specifications for Health Safety and Functional Evaluation of Drinking Water Quality Processors—General Water Quality Processors" & EPA2008 ICP/MS. A water sample containing these heavy metals at concentrations 5 times of the safe drinking water was used. The test results are shown in FIG. 4, which show the removal rates of these heavy metals as a function of contact time with the functional ceramic material prepared in Example 1.

Measurement of Adsorption Capacity of Functional Ceramic Material on Single-Ringed and Polycyclic Aromatic Hydrocarbons (PAH)

1. Materials:

The functional ceramic materials prepared in Examples 1 to 3 herein.

Sea water from the Bohai Sea coast of Qinhuangdao City Gold Coast Emerald Island (China) and Tianjin Binhai (China).

Crude oil: obtained from PetroChina.

2. Detection Methods for Single-Ringed and Polycyclic Aromatic Hydrocarbons:

Single-ringed aromatics: Purge-and-Trap Gas Chromatography-Mass Spectrometry.

Polycyclic aromatic hydrocarbons were tested by High Performance Liquid Chromatography (HPLC).

3. Experimental Methods:

Experiment 1:

(1) The crude oil and sea water at a 1:100 ratio was fully mixed and shaken for 12 hours, then the mixture was let stand for another 6 hours.

(2) 200 ml of the mixture was added to a 250 ml reagent bottle. Into each such bottle was added 4 g of the functional ceramic material prepared in Examples 1-3, respectively, and shake the mixture at 100 rpm on a shaker. The mixture in each of the bottles was sampled at 2, 4, 8, 16, 24, 36, 48 and 72 hours after the addition of the functional ceramic material. The retrieved samples were sealed, inverted and preserved at 4° C., and sent to China National Geological Survey Institute of Geological Test Center for testing.

Experiment 2:

(1) The crude oil and sea water at a 1:100 ratio was fully mixed and shaken for 12 hours, then the mixture was let stand for another 6 hours.

(2) 3000 ml of the mixture was added to a 3500 ml reagent bottle. Into the bottle was further added 60 g of the functional ceramic material prepared in Example 1. The mixture was shaken at 100 rpm on a shaker. The mixture in the bottle was sampled at 2, 6, 14, 26, 50, 74 and 98 hours after the addition of the functional ceramic material. The retrieved samples were sealed, inverted and preserved at 4° C., and sent to China National Geological Survey Institute of Geological Test Center for testing.

Experiment 3:

(1) The crude oil and sea water at a 1:100 ratio was fully mixed and shaken for 12 hours, then the mixture was let stand for another 6 hours.

(2) 3000 ml of the mixture was added to a 3500 ml reagent bottle. Into the bottle was further added 5 g of the functional ceramic material prepared in Example 1. The mixture was shaken at 100 rpm on a shaker. The mixture in the bottle was sampled at 2, 6, 14, 26, 50, 74 and 98 hours after the addition of the functional ceramic material. The retrieved samples were sealed, inverted and preserved at 4° C., and sent to China National Geological Survey Institute of Geological Test Center for testing.

4. Testing Results

The results of the Experiment 1 are shown in Table 2; the results of Experiment 2 are shown in Table 3; and the results of Experiment 3 are shown in Table 4.

TABLE 2

Test results of adsorption capacity of functional ceramic materials made according to Examples 1-3 for single-ringed aromatics (ng/mL) in crude oil

| Source of functional Ceramic Material | Analyte | Detection Limit | 0 h | 2 h | 4 h | 8 h | 16 h | 24 h | 36 h | 48 h | 72 h |
|---|---|---|---|---|---|---|---|---|---|---|---|
| EXAMPLE 1 | Benzene | 1.00 | 2.67 | <1.00 | <1.00 | <1.00 | <1.00 | <1.00 | <1.00 | <1.00 | <1.00 |
| | Toluene | 1.00 | 4.19 | 1.15 | 1.31 | <1.00 | <1.00 | <1.00 | <1.00 | <1.00 | <1.00 |
| | Ethylbenzene | 1.00 | <1.00 | <1.00 | <1.00 | <1.00 | <1.00 | <1.00 | <1.00 | <1.00 | <1.00 |
| | M-xylene | 1.00 | 5.07 | <1.00 | <1.00 | <1.00 | <1.00 | <1.00 | <1.00 | <1.00 | <1.00 |
| | O-xylene | 1.00 | 3.67 | 1.27 | <1.00 | <1.00 | <1.00 | <1.00 | <1.00 | <1.00 | <1.00 |
| | Styrene | 1.00 | <1.00 | <1.00 | <1.00 | <1.00 | <1.00 | <1.00 | <1.00 | <1.00 | <1.00 |

TABLE 2-continued

Test results of adsorption capacity of functional ceramic materials made according to Examples 1-3 for single-ringed aromatics (ng/mL) in crude oil

| Source of functional Ceramic Material | Analyte | Detection Limit | 0 h | 2 h | 4 h | 8 h | 16 h | 24 h | 36 h | 48 h | 72 h |
|---|---|---|---|---|---|---|---|---|---|---|---|
| EXAMPLE 2 | Benzene | 1.00 | 2.67 | <1.00 | <1.00 | <1.00 | <1.00 | <1.00 | <1.00 | <1.00 | <1.00 |
| | Toluene | 1.00 | 4.19 | 1.07 | <1.00 | <1.00 | <1.00 | <1.00 | <1.00 | <1.00 | <1.00 |
| | Ethylbenzene | 1.00 | <1.00 | <1.00 | <1.00 | <1.00 | <1.00 | <1.00 | <1.00 | <1.00 | <1.00 |
| | M-xylene | 1.00 | 5.07 | <1.00 | <1.00 | <1.00 | <1.00 | <1.00 | <1.00 | <1.00 | <1.00 |
| | O-xylene | 1.00 | 3.67 | 1.05 | <1.00 | <1.00 | <1.00 | <1.00 | <1.00 | <1.00 | <1.00 |
| | Styrene | 1.00 | <1.00 | <1.00 | <1.00 | <1.00 | <1.00 | <1.00 | <1.00 | <1.00 | <1.00 |
| EXAMPLE 3 | Benzene | 1.00 | 2.67 | <1.00 | <1.00 | <1.00 | <1.00 | <1.00 | <1.00 | <1.00 | <1.00 |
| | Toluene | 1.00 | 4.19 | <1.00 | 1.18 | 1.01 | <1.00 | <1.00 | <1.00 | <1.00 | <1.00 |
| | Ethylbenzene | 1.00 | <1.00 | <1.00 | <1.00 | <1.00 | <1.00 | <1.00 | <1.00 | <1.00 | <1.00 |
| | M-xylene | 1.00 | 5.07 | <1.00 | <1.00 | <1.00 | <1.00 | <1.00 | <1.00 | <1.00 | <1.00 |
| | O-xylene | 1.00 | 3.67 | <1.00 | 1.19 | <1.00 | <1.00 | <1.00 | <1.00 | <1.00 | <1.00 |
| | Styrene | 1.00 | <1.00 | <1.00 | <1.00 | <1.00 | <1.00 | <1.00 | <1.00 | <1.00 | <1.00 |

As seen from Table 2, volatile benzene compounds such as benzene, toluene, ethylbenzene, m-xylene, o-xylene, and styrene in the mixture of petroleum and seawater have been adsorbed by the functional ceramic material completely (they are below the detection limit) in 2 to 4 hours. This shows the functional ceramic materials of the present invention have high adsorption capacity of single-ringed aromatics in the petroleum products.

TABLE 3

Test results of adsorption capacity of functional ceramic materials made in Example 1 for single-ringed and polycyclic aromatic hydrocarbons in crude oil

| Compounds | Unit | Detection Limit | 0 h | 2 h | 6 h | 14 h | 26 h | 50 h | 74 h | 98 h |
|---|---|---|---|---|---|---|---|---|---|---|
| Benzene | ng/mL | 1.00 | 11725 | 9042 | 4393 | 2499 | 408.9 | <1.00 | <1.00 | 23.2 |
| Toluene | ng/mL | 1.00 | 5151 | 4042 | 1357 | 627 | 2.91 | <1.00 | <1.00 | 2.00 |
| Ethylbenzene | ng/mL | 1.00 | 341 | 230 | 130 | <1.00 | <1.00 | <1.00 | <1.00 | <1.00 |
| M-xylene | ng/mL | 1.00 | 1223 | 824 | 170 | <1.00 | <1.00 | <1.00 | <1.00 | <1.00 |
| O-xylene | ng/mL | 1.00 | 765 | 598 | 326 | 107 | <1.00 | <1.00 | <1.00 | <1.00 |
| Styrene | ng/mL | 1.00 | <1.00 | <1.00 | <1.00 | <1.00 | <1.00 | <1.00 | <1.00 | <1.00 |
| Naphthalene | ng/L | 12 | 525 | 522 | 136 | 165 | 120 | 51.4 | 45.4 | 52.7 |
| Acenaphthene | ng/L | 7 | 170 | 146 | 85 | 36.4 | 203 | 4.15 | <7.00 | 50.9 |
| Fluorene | ng/L | 5 | 380 | 356 | 54.9 | 21.5 | 22.7 | <5.00 | <5.00 | 6.93 |
| Phenanthrene | ng/L | 15 | 804 | 731 | 93.1 | 79.3 | 167 | 27.8 | 22.4 | 96.4 |
| Anthracene | ng/L | 5 | 16.2 | 12.5 | <5.00 | <5.00 | <5.00 | <5.00 | <5.00 | <5.00 |
| Fluoranthene | ng/L | 7 | 88.9 | 23.9 | 8.36 | <7.00 | 13.9 | <7.00 | <7.00 | <7.00 |
| Pyrene | ng/L | 4 | 104 | 53.9 | 22.1 | 5.41 | 35.3 | <4.00 | <4.00 | 11.1 |
| Benzo [a] anthracene | ng/L | 3 | 52.6 | 14.1 | 16.1 | <3.00 | 19 | <3.00 | <3.00 | <3.00 |
| chrysene | ng/L | 3 | <3.00 | <3.00 | <3.00 | <3.00 | <3.00 | <3.00 | <3.00 | <3.00 |
| Benzo [b] fluoranthene | ng/L | 4 | <4.00 | <4.00 | <4.00 | <4.00 | <4.00 | <4.00 | <4.00 | <4.00 |
| Benzo [k] fluoranthene | ng/L | 2 | <2.00 | <2.00 | <2.00 | <2.00 | <2.00 | <2.00 | <2.00 | <2.00 |
| Benzo [a] pyrene | ng/L | 2 | <2.00 | <2.00 | <2.00 | <2.00 | <2.00 | <2.00 | <2.00 | <2.00 |
| Dibenzo [a, h] anthracene | ng/L | 4 | <4.00 | <4.00 | <4.00 | <4.00 | <4.00 | <4.00 | <4.00 | <4.00 |
| Benzo [g, h, i] perylene | ng/L | 4 | <4.00 | <4.00 | <4.00 | <4.00 | <4.00 | <4.00 | <4.00 | <4.00 |
| Indeno [1,2,3-cd] pyrene | ng/L | 5 | <5.00 | <5.00 | <5.00 | <5.00 | <5.00 | <5.00 | <5.00 | <5.00 |
| Acenaphthylene | ng/L | 20 | <20.0 | <20.0 | <20.0 | <20.0 | <20.0 | <20.0 | <20.0 | <20.0 |

TABLE 4

Test results of adsorption capacity of functional ceramic materials made according to Example 1 for single-ringed and polycyclic aromatic hydrocarbons in crude oil

| Compounds | Unit | Detection Limit | 0 h | 2 h | 6 h | 14 h | 26 h | 50 h | 74 h | 98 h |
|---|---|---|---|---|---|---|---|---|---|---|
| Benzene | ng/mL | 1.00 | 5047.5 | 4709.4 | 4224.1 | 3788.5 | <1.00 | <1.00 | <1.00 | <1.00 |
| Toluene | ng/mL | 1.00 | 1365.8 | 1304.4 | 546.13 | 392.62 | <1.00 | <1.00 | <1.00 | <1.00 |
| Ethylbenzene | ng/mL | 1.00 | <1.00 | <1.00 | <1.00 | <1.00 | <1.00 | <1.00 | <1.00 | <1.00 |

TABLE 4-continued

Test results of adsorption capacity of functional ceramic materials made according
to Example 1 for single-ringed and polycyclic aromatic hydrocarbons in crude oil

| Compounds | Unit | Detection Limit | 0 h | 2 h | 6 h | 14 h | 26 h | 50 h | 74 h | 98 h |
|---|---|---|---|---|---|---|---|---|---|---|
| M-xylene | ng/mL | 1.00 | <1.00 | <1.00 | <1.00 | <1.00 | <1.00 | <1.00 | <1.00 | <1.00 |
| O-xylene | ng/mL | 1.00 | 390.97 | 352.7 | 159.43 | 165.15 | <1.00 | <1.00 | <1.00 | <1.00 |
| Styrene | ng/mL | 1.00 | <1.00 | <1.00 | <1.00 | <1.00 | <1.00 | <1.00 | <1.00 | <1.00 |
| Naphthalene | ng/L | 12 | 32808 | 22694 | 11011 | 10422 | 51.6 | 108 | 298 | 48.1 |
| Acenaphthene | ng/L | 7 | 189 | 161 | 173 | 106 | <7.00 | <7.00 | <7.00 | <7.00 |
| Fluorene | ng/L | 5 | 521 | 442 | 303 | 163 | <5.00 | <5.00 | 11 | <5.00 |
| Phenanthrene | ng/L | 15 | 2300 | 1574 | 1037 | 404 | <15.0 | <15.0 | <15.0 | <15.0 |
| Anthracene | ng/L | 5 | 13.9 | 11.2 | 11.2 | 4.18 | <5.00 | <5.00 | <5.00 | <5.00 |
| Fluoranthene | ng/L | 7 | 24.5 | 27.8 | 13.3 | 4.86 | <7.00 | <7.00 | <7.00 | <7.00 |
| Pyrene | ng/L | 4 | 57.8 | 38 | 51.2 | 12.8 | 8.48 | 3.68 | <4.00 | <4.00 |
| Benzo [a] anthracene | ng/L | 3 | <3.00 | <3.00 | <3.00 | <3.00 | <3.00 | <3.00 | <3.00 | <3.00 |
| Chrysene | ng/L | 3 | <3.00 | <3.00 | <3.00 | <3.00 | <3.00 | <3.00 | <3.00 | <3.00 |
| Benzo [b] fluoranthene | ng/L | 4 | <4.00 | <4.00 | <4.00 | <4.00 | <4.00 | <4.00 | <4.00 | <4.00 |
| Benzo [k] fluoranthene | ng/L | 2 | <2.00 | <2.00 | <2.00 | <2.00 | <2.00 | <2.00 | <2.00 | <2.00 |
| Benzo [a] pyrene | ng/L | 2 | <2.00 | <2.00 | <2.00 | <2.00 | <2.00 | <2.00 | <2.00 | <2.00 |
| Dibenzo [a, h] anthracene | ng/L | 4 | <4.00 | <4.00 | <4.00 | <4.00 | <4.00 | <4.00 | <4.00 | <4.00 |
| Benzo [g, h, i] perylene | ng/L | 4 | <4.00 | <4.00 | <4.00 | <4.00 | <4.00 | <4.00 | <4.00 | <4.00 |
| Indeno [1,2,3-cd] pyrene | ng/L | 5 | <5.00 | <5.00 | <5.00 | <5.00 | <5.00 | <5.00 | <5.00 | <5.00 |
| Acenaphthylene | ng/L | 20 | <20.0 | <20.0 | <20.0 | <20.0 | <20.0 | <20.0 | <20.0 | <20.0 |

Adsorption Capacity of Functional Ceramic Materials made according to Example 1 on Oil Benzene.

To measure the adsorption capacity of functional ceramic materials on aromatics in crude oil, the adsorption capacity of the functional ceramic materials was calculated according to the following formula:

$$K=(A \times V)/M$$

where K stands for the amount of aromatics adsorbed per gram of functional ceramic materials, "A" stands for the reduction in the concentration of the aromatics, V stands for the volume (3000 ml), and M stands for the grams of functional ceramic materials.

The results are shown in Table 5 and Table 6.

TABLE 5

| Volatile organic compounds | 60 g/3000 mL K (mg/g) | 5 g/3000 mL K (mg/g) |
|---|---|---|
| Benzene | 0.586 | 3.029 |
| Toluene | 0.258 | 0.819 |
| Ethylbenzene | 0.017 | 0 |
| M-xylene | 0.061 | 0 |
| O-xylene | 0.038 | 0.235 |
| Styrene | 0 | 0 |
| Total | 0.960 | 4.086 |

TABLE 6

| Polycyclic Aromatic Hydrocarbons | 60 g/3000 mL K (ng/g) | 5 g/3000 mL K (ng/g) |
|---|---|---|
| Naphthalene | 23.98 | 19656 |
| Acenaphthene | 8.50 | 113.40 |
| Fluorene | 19.00 | 312.60 |
| Phenanthrene | 40.20 | 1380.00 |
| Anthracene | 0.81 | 8.34 |

TABLE 6-continued

| Polycyclic Aromatic Hydrocarbons | 60 g/3000 mL K (ng/g) | 5 g/3000 mL K (ng/g) |
|---|---|---|
| Fluoranthene | 4.445 | 14.70 |
| Pyrene | 5.20 | 34.68 |
| Benzo [a] anthracene | 2.63 | 0 |
| chrysene | 0 | 0 |
| Benzo [b] fluoranthene | 0 | 0 |
| Benzo [k] fluoranthene | 0 | 0 |
| Benzo [a] pyrene | 0 | 0 |
| Dibenzo [a, h] anthracene | 0 | 0 |
| Benzo [g, h, i] perylene | 0 | 0 |
| Indeno [1,2,3-cd] pyrene | 0 | 0 |
| Acenaphthylene | 0 | 0 |
| Total | 104.765 | 21519.72 |

The present invention has been described in detail examples hereinabove. The purpose of descriptions and examples is to help any skilled personal in the industry accurately understand and practice the present invention. The examples and descriptions above do not in any way limit the scope of the invention. Any equivalent variations or modifications in accordance with the spirit of the present invention are intended to be encompassed within the scope of the present invention.

What is claimed is:

1. A functional ceramic material prepared by a method comprising:
   calcining a mixture of raw materials at 800° C. to 900° C. under an anaerobic condition, the mixture including: 0.1-0.5 wt % of iron powder, 20-25 wt % of bentonite, and the remainder being sludge, wherein the sum of the weight percentage of ion powder, bentonite, and sludge, where the percentage of the sludge is based on its dry weight, equal to 100%.

2. The functional ceramic material according to claim 1, wherein the iron powder in the mixture of raw materials comprises zero-valent iron having a particle diameter of 20-80 nanometers.

3. The functional ceramic material according to claim 1, wherein the sludge in the mixture of raw materials is produced by treating a waste water with an activated sludge process.

4. The functional ceramic material of claim 1, wherein the functional ceramic material includes mesopores with a pore size of 1-50 nanometers and micropores with a pore size greater than 50 micrometers.

5. A method for producing a functional ceramic material, comprising:
    calcining a mixture of raw materials at a calcination temperature between 800° C. and 900° C. under an anaerobic condition, the mixture including: 0.1-0.5 wt % of iron powder, 20-25 wt % of bentonite, and the remainder being sludge, wherein the sum of the weight percentage of ion powder, bentonite, and sludge, where the percentage of the sludge is based on its dry weight, equal to 100%.

6. The method of claim 5, wherein the calcining is carried out at a temperature between 830° C. and 870° C.

7. The method of claim 5, wherein the calcining is carried out for a duration of time between 4 h to 6 h.

8. The method of claim 5, further comprising:
    before calcining the mixture, stirring and mixing the mixture at a temperature between 0° C. and 40° C. at a stirring speed of 40-80 r/min; and
    heating the mixture up to the calcination temperature.

9. The method of claim 8, wherein the stirring and mixing is performed for a duration of time between 1 hour to 4 hours.

10. The method of claim 8, wherein the heating is carried out at a rate of 4° C. to 6° C./min.

11. A method of purifying a medium, comprising:
    contacting a medium with the functional ceramic material of claim 1, thereby purifying the medium.

12. The method of claim 11, wherein the medium is water.

13. The method of claim 11, wherein the medium is a mixture of water and petroleum.

14. The method of claim 11, wherein the medium comprises at least one single-ringed aromatic hydrocarbon, and contacting the medium with the functional ceramic material reduces the amount of the at least one single-ringed aromatic hydrocarbon in the medium.

15. The method of claim 11, wherein the medium comprises at least one polycyclic aromatic hydrocarbon, and contacting the medium with the functional ceramic material reduces the amount of the at least one polycyclic aromatic hydrocarbon in the medium.

16. The method of claim 11, wherein the medium comprises a heavy metal, and contacting the medium with the functional ceramic material reduces the amount of the heavy metal in the medium.

17. The method of claim 16, wherein the heavy metal is selected from the group consisting of As, Cd, Hg, Tl, Pb, and U.

* * * * *